United States Patent [19]

Shemtov

[11] 4,088,348
[45] May 9, 1978

[54] UNIVERSALLY ANGULARLY ADJUSTABLE PIPE COUPLING

[75] Inventor: Sami Shemtov, Central Islip, N.Y.

[73] Assignee: Gould Inc., East Farmingdale, N.Y.

[21] Appl. No.: 767,002

[22] Filed: Feb. 9, 1977

[51] Int. Cl.² ............................................. F16L 27/04
[52] U.S. Cl. ..................................... 285/184; 285/263
[58] Field of Search ....................... 285/184, 263, 264; 403/361

[56] References Cited

U.S. PATENT DOCUMENTS

| 918,144 | 4/1909 | Greenlaw | 285/263 |
| 3,874,706 | 4/1975 | Arnold | 285/184 |

FOREIGN PATENT DOCUMENTS

| 826,324 | 3/1938 | France | 285/184 |

*Primary Examiner*—Patrick D. Lawson
*Attorney, Agent, or Firm*—Howard C. Miskin

[57] ABSTRACT

A universally angularly adjustable sealable pipe coupling comprises a first coupling member including a first outer internally threaded pipe engaging section and an inner socket section of increasing radii of curvature approaching its open end and a second coupling member including an inner ball section with inside and outside faces of increasing radii of curvature approaching an open free end, the ball section registering with the socket and a second outer internally threaded pipe engaging section. A tubular plastic locking member includes a locking section having a curved outside face engaging the ball section inside face and a coaxial tubular shank slideably engaging the inner end of the first pipe engaging section. The first and second coupling members are relatively universally angularly adjustable and are locked in the present position by tightening a pipe in the first coupling section to advance the locking member.

9 Claims, 4 Drawing Figures

U.S. Patent May 9, 1978 4,088,348
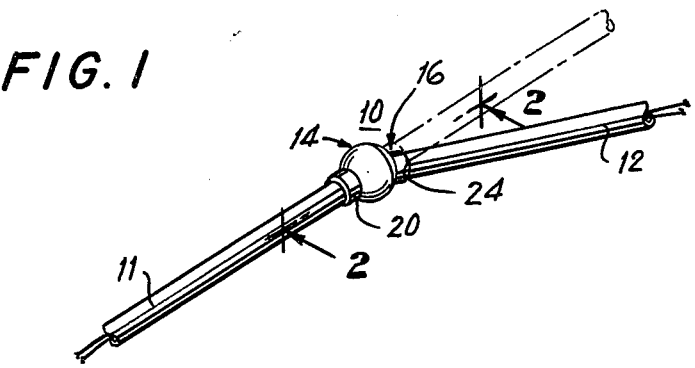
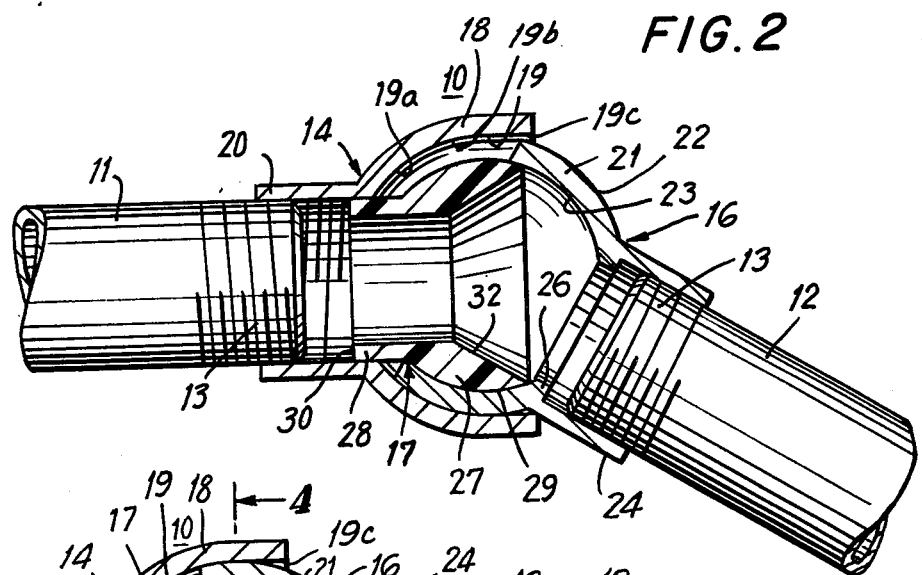
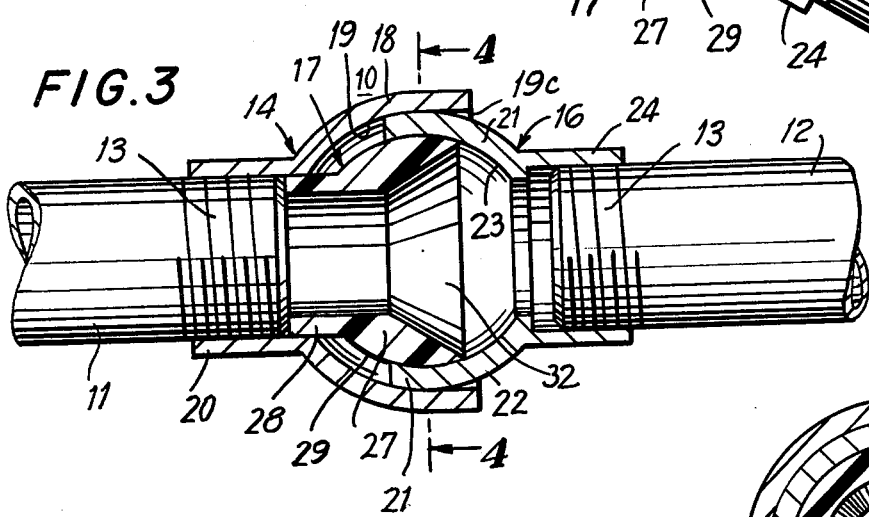
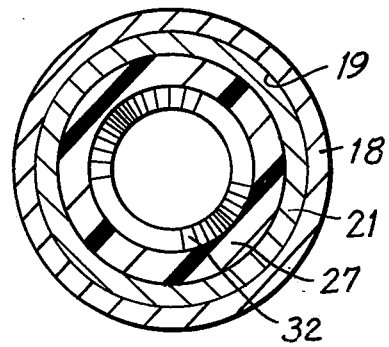

UNIVERSALLY ANGULARLY ADJUSTABLE PIPE COUPLING

BACKGROUND OF THE INVENTION

The present invention relates generally to improvements in pipe fittings and it relates more particularly to an improved universally angularly adjustable coupling device for pipes such as conduits and the like.

It is customarily necessary or desirable to couple pipes such as conduit or the like end-to-end and it often occurs that the end-to-end pipes are not coaxial but are angularly related, usually at a small angle, so that if the device employed in coupling the pipes is of the linear union type and undesirable stress is imparted to the pipes and coupling device with the attendant likelihood of failure or damage and leakage. Moreover, it frequently happens that the end-to-end pipes are so mounted and angularly related that it is very difficult, if not impossible, to properly couple the pipes with a linear union. Numerous coupling devices have been heretofore proposed for coupling pipes end-to-end which are at various angles to each other but these possess numerous drawbacks and disadvantages. They are unreliable devices which are difficult to apply, are complicated and expensive, of little versitility and adaptability, and otherwise leave much to be desired.

SUMMARY OF THE INVENTION

It is accordingly a principal object of the present invention to provide an improved pipe fitting.

Another object of the present invention is to provide an improved device for coupling pipes such as conduits and the like end-to-end.

Still another object of the present invention is to provide a universally angularly adjustable pipe coupling.

A further object of the present invention is to provide a coupling device of the above nature characterized by its reliability, ruggedness, simplicity, low cost, ease of application and great versatility and adaptability.

The above and other objects of the present invention will become apparent from a reading of the following description taken in conjunction with the accompanying drawings which illustrate a preferred embodiment thereof.

In a sense, the present invention contemplates the provision of a universally angularly adjustable pipe coupling device comprising a first coupling member including an inner open ended socket section with a concave inside face of circular transverse cross-section and curved longitudinal cross-section and an outer first tubular pipe engaging section, a second coupling member including an inner open ended hollow ball section with transversely circular and longitudinally curved concave inside and convex outside faces, and in engagement with the socket section inside face and universally rockable in the socket and an outer tubular pipe engaging section and an open ended locking member engaging the ball section inside face and being longitudinally movable therein between an advanced lock position tightly engaging the ball section inside face to restrict the angular movement between the coupling members and a retracted position releasing the ball section inside face and permitting the angular adjustment between the coupling members.

In the preferred form of the improved device, the socket section inside face and the ball section inside and outside faces have longitudinal cross sections with successive sections toward their inner open ends are of successive greater radii of curvature and the pipe coupling sections have threaded axial bores for engaging correspondingly threaded pipe ends. The locking member is formed of a polymeric resin and has a curved convex outer face of circular transverse cross-section and a tapered axial inside face and terminates at its outer end in a cylindrical tubular shank which slideably engages the first pipe coupling section bore so that upon the screw tightening of a pipe therein, the pipe advances the locking member by way of the locking member shank to effect the locking of the coupling members in a fixed angular position.

The improved universally angularly adjustable pipe coupling device is reliable and rugged, reliably sealed, easily and rapidly applied and adjusted, and of great versatility and adaptability.

BRIEF DESCRIPTION OF THE DRAWINGS

FIG. 1 is a perspective view of a pair of end-to-end angularly related conduits coupled by a device embodying the present invention, the coupling device and coaxially coupled pipes being shown by broken line;

FIG. 2 is an enlarged sectional view taken along line 2—2 in FIG. 1;

FIG. 3 is a view similar to FIG. 2 with the coupled pipes shown in coaxial position; and FIG. 4 is a sectional view taken along line 4—4 in FIG. 3.

DESCRIPTION OF THE PREFERRED EMBODIMENT

Referring now to the drawings which illustrate a preferred embodiment of the present invention, the reference numeral 10 generally designates the improved universally angularly adjustable pipe coupling device which is shown coupling a pair of cable conduits 11 and 12 which are end-to-end and either coaxial or angularly related. While the coupling device 10 is shown as connecting conduits 11 and 12, it may be employed with other forms of pipe. The conduits 11 and 12 are threaded at their ends, as at 13, to facilitate their attachment to the coupling device 10.

The coupling device 10 comprises three interfitting members, a first coupling or socket member 14 formed of metal, a second coupling or ball member 16 likewise formed of metal, and a releasable locking member 17 formed of a synthetic organic polymeric resin of any suitable composition.

The first coupling member 14 is of tubular configuration and includes an inner socket section 18 of uniform wall thickness and with an inside face 19 of circular transverse cross-section having a wide end opening and a narrow axially opposite opening, the successive inner sections 19a and 19b inside face 19 being of successively greater radius of curvature and terminating in an end section 19c of cylindrical configuration. Projecting outwardly from and integrally formed with socket section 18 is an internally threaded coaxial tubular pipe coupling section 20.

The second coupling member 16 includes an inner open ended hollow ball section 21 of uniform wall thickness having an outside face 22 and a similar inside face 23, both of circular transverse cross-section and of curved longitudinal cross-section with successive portions being of successively greater radius of curvature. The outer portion of ball section 23 nests in the socket section 18 with ball section outside face 22 slideably engaging socket face 19 so that coupling members 14 and 16 are relatively universally angularly adjustable. Coaxially outwardly projecting from and integrally formed with ball section 21 is an internally threaded tubular pipe coupling section 24 terminating at its inner end in a peripheral stop defining flange 26.

The locking member 17 includes an integrally formed inner head section 27 and an outer actuating section 28. The outer face 29 of locking head section 27 is of spherical configuration and engages the ball section inside face 23 so that the wall of ball section 21 is slideably sandwiched between socket face 19 and locking section outside face 29. The actuating section 28 is in the form of a cylindrical tubular shank coaxial with head 27 and having a coaxial bore and slideably registering with the inner end of the axial bore of pipe coupling section 20. The shank 28 terminates in an outer peripheral shoulder 30. The axial bore in shank 28 joins a forwardly outwardly flaring recess 32 coaxially formed in locking head 27 so that there is a free passgeway through locking member 17 to provide free communication between pipe coupling sections 20 and 24.

In the operation and application of the improved pipe coupling 10, the threaded ends of pipes 11 and 12 are screwed into corresponding pipe coupling sections with the ends of pipe 11 lightly abutting shank shoulder 30 and the end of pipe 12 tightly engaging the stop flange 26. The pipes 11 an 12 are then swung about coupling device 10 to the desired relative angle, correspondingly rocking the respective coupling members 14 and 16 which are in unlocked condition. The coupling device 10 is then locked against angular movement between coupling members 14 and 16 by further tightening pipe 11 in coupling section 20 by either turning pipe 11 or coupling member 14 in a pipe tightening direction. With the turn tightening of pipe 11 in coupling section 20, it bears on shank shoulder 30 to advance the locking member 17 and urge the locking head outside face 29 into tight engagement with ball sections inside face 23 and the ball section outside face 22 into tight engagement with socket face 19 to lock the coupling sections 14 and 16 against relative angular movement. To readjust the angle of pipes 11 and 12, pipe 11 is merely loosened in coupling section 20 to loosen the locking member 17 and coupling members 14 and 16, the pipe angle is adjusted and the pipe 11 retightened as above.

While there has been described and illustrated a preferred embodiment of the present invention, it is apparent that numerous alterations, corrections and additions may be made without departing from the spirit thereof.

I claim:

1. A universally angularly adjustable pipe coupling device comprising:
   a first coupling member including an inner open ended socket section with a concave inside face of circular transverse cross-section and curved longitudinal cross-section and an outer first tubular pipe engaging section;
   a second coupling member including an inner open ended hollow ball section having a wall with transversely circular and longitudinally curved concave inside and convex outside faces and engaging said socket section inside face and universally rockable therein and an outer tubular pipe engaging section; and
   an open ended locking member engaging said ball section inside face and sandwiching said ball section wall between the confronting faces of said locking member and said socket section and being longitudinally selectively movable therein between an advanced lock position tightly engaging said ball section inside face to restrict the angular movement of said second coupling member relative to said first coupling member and a retracted position releasing said ball section inside face to permit angular adjustment between said first and second coupling members.

2. The coupling device of claim 1 comprising means responsive to the engagement of a pipe by said first pipe engaging section for advancing said locking member to its lock position.

3. The coupling device of claim 2 wherein said locking means comprises a tubular shank coaxially projecting from said locking member into sliding engagement with the interior of said first pipe engaging section.

4. A universally angularly adjustable pipe coupling device comprising:
   a first coupling member including an inner open ended socket section with a concave inside face of circular transverse cross-section and curved longitudinal cross-section and an outer first tubular pipe engaging section having an internally threaded axial bore;
   a second coupling member including an inner open ended hollow ball section with transversely circular and longitudinally curved concave inside and convex outside faces and engaging said socket section inside face and universally rockable therein and an outer tubular pipe engaging section;
   an open ended locking member engaging said ball section inside face and being longitudinally movable therein between an advanced lock position tightly engaging said ball section inside face to restrict the angular movemement of said second coupling member relative to said first coupling member and a retracted position releasing said ball section inside face to permit angular adjustment between said first and second coupling members; and
   means responsive to the engagement of a pipe by said first pipe engaging section for advancing said locking member to its lock position and including a tubular shank coaxially projecting from said locking member into sliding engagement with the internally threaded bore of said first pipe engaging section and terminating in a shoulder disposed within said bore.

5. The coupling device of claim 4 wherein said locking member has an outside convex face of circular transverse cross-section engaging said ball section inside face.

6. The coupling device of claim 5 wherein said locking member includes an axial bore outwardly flared at its outer end.

7. The coupling device of claim 6 wherein said locking member and tubular shank are integrally formed of a synthetic organic polymeric resin.

8. The coupling device of claim 7 wherein said socket section inside face includes longitudinally spaced sections of successively larger radii of curvature toward the outer end of said socket section.

9. The coupling device of claim 8 wherein said ball section inside and outside faces each include longitudinally spaced sections of successively larger radii of curvature toward the outer end of said ball section.

* * * * *